Jan. 21, 1964  A. I. KETO  3,118,410
DEPTH CONTROL
Filed Oct. 7, 1946
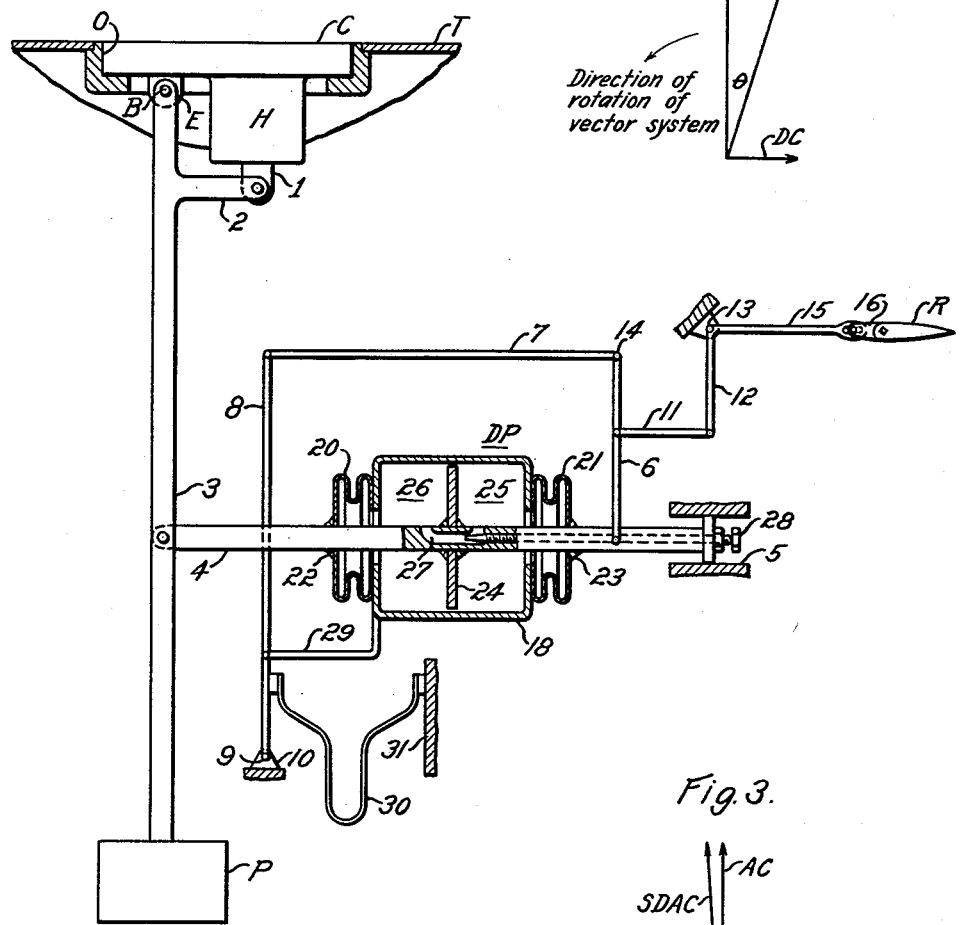
WITNESSES:
Wm. B. Sellers.
INVENTOR
August I. Keto.
BY
Paul C. Friedemann
ATTORNEY ދ,118,410
DEPTH CONTROL
August I. Keto, Los Altos, Calif., assignor, by mesne assignments, to the United States of America as represented by the Secretary of the Navy
Filed Oct. 7, 1946, Ser. No. 701,838
5 Claims. (Cl. 114—25)

My invention relates to control devices and, more particularly, to depth control devices for torpedoes or similar submersible crafts.

The Government of the United States has been granted a certain royalty-free license for governmental purposes with respect to the invention herein described.

With the depth control devices heretofore used on torpedoes, the motion of the rudder actuating arm, and, in turn, the motion of the elevator rudders is dependent only on the torpedo aspect angle and the depth of the torpedo, namely, the vertical distance in the water of the torpedo above or below a set depth. Briefly stated, these depth control mechanisms at present in use as standard equipment are composed of a pendulum mechanically coupled to a depth setting spring coacting with a hydrostatic device.

An inherent limitation of this so-called standard control is that the rudder position lags the angular position of the torpedo body. This lag of the rudders is caused by the inherent lag of ninety degrees of the depth control effect with reference to the control effect produced by the pendulum measuring the angular deviation of the torpedo axis with reference to its aspect angle. In normal operation of a torpedo at normal speed, to counteract the negative buoyancy of the torpedo and possibly some other minor factors, as, for example, the angular disposition of the stabilizing fins with reference to the torpedo axis and/or the hydrodynamic characteristics of the torpedo body, the control devices actuated by the pendulum are so adjusted on the torpedo with reference to the vertical position of the pendulum when the torpedo axis is horizontal, that the torpedo operates with a nose-up position. The normal aspect angle is the angle the torpedo axis makes with a horizontal plane because of this nose-up operation.

One broad object of my invention is the provision of an anticipating control effect to compensate for the lag in the control effect of the depth responsive devices used in conjunction with pendulous devices on a submersible craft as a torpedo.

Another object of my invention is the provision of a leading control effect, responsive to the angular velocity of a torpedo, on the depth control devices of a torpedo to thus compensate for certain lagging control effects.

A somewhat more specific object of my invention is the provision of an adjustable leading control effect, responsive to the angular velocity of a torpedo, on the depth control devices used on a torpedo to thus either over-compensate, compensate, or under-compensate for certain lagging control effects of the depth control mechanisms.

A still further object of my invention is the provision of an adjustable leading control effect, responsive to the angular velocity of a torpedo in a vertical plane, on the depth control devices used on a torpedo, to thus so compensate for certain lagging control effects that torpedoes having different rated speeds are maintained at the proper depth.

Other objects and advantages will become more apparent from a study of the following specification and the drawing, in which:

FIGURE 1 is a schematic showing of my invention as applicable to the elevator rudders of a torpedo; and FIGS. 2 and 3 show some vector diagrams of aid in pointing out the merits of my invention.

In FIG. 1, T represents the torpedo body which may be a portion of the afterbody near the tailcone or actually a part of the tailcone. Certain elements of the depth control devices are disposed in a suitable handhole O in the torpedo body. The hydrostatic depth responsive device H is mounted in the cover C and the pendulum P is pivoted on suitable bearings B in the ears E depending from the cover C. The arrangement is such that when the handhole cover is removed, the pendulum and hydrostatic device can be readily removed, regardless of whether the handhole cover and the mounting base for the hydrostatic device are the same element as C, or comprise two separate superimposed plates.

The hydrostatic device H is, per se, of well known construction including a diaphragm and an adjustable spring so that the depth setting may be readily made. For a description of the details of the hydrostatic device, reference may be had to the United States Letters Patent of Merril G. Leonard, issued March 18, 1947, No. 2,417,768, and entitled Control Device.

To the bottom of the diaphragm (not shown), I secure a plunger 1 coacting with the arm 2 to swing the pendulum P forward, or clockwise, in case the torpedo is at a depth greater than the set depth, and in the aft direction, or counterclockwise if the torpedo is at a lesser depth than the set depth.

Since the pendulum tends to hang vertically, its position with reference to the torpedo axis is thus a measure of the direction of the torpedo axis with reference to the aspect angle.

To the rigid suspending bar 3 of the pendulum, I secure the direct coupling arm 4 arranged to slide in a low friction bearing 5 at its aft end. A floating arm 6 has its lower end pivotally secured to the direct coupling arm 4 and the upper end pivotally secured to the aft end of the floating link 7. The forward end of the floating link 7 is pivotally secured to the vertically disposed bar 8 pivoted at 9 in a member 10 fixed to the torpedo frame.

At a selected point intermediate the ends of floating arm 6, a link 11 is pivotally secured. At the aft end link 11 is pivotally secured to the bell-crank lever 12 pivoted on the torpedo frame at 13. The aft end of the bell-crank lever is disposed to actuate any suitable type of rudder actuating mechanism which may be electromagnetic, hydrostatic, or mechanical as schematically shown. As shown, the aft end 15 of the bell-crank lever operates the yoke 16 of the elevator rudders R. Clockwise rotation of end 15 moves the rudders to up rudder position and counterclockwise rotation moves the rudders to down-rudder position.

The control effect of the hydrostatic device inherently lags behind the control effect produced by the pendulum in its swing with reference to the aspect angle. This is shown graphically by the vector diagram shown in FIG. 2.

To understand the function illustrated by FIG. 2, let the assumption be that the floating link 7 is fixed with reference to the torpedo frame. The floating arm 6 would thus operate about a fixed pivot at 14. The fore and aft movement of link 11 would thus be truly proportional to the swing of bar 4. However, since the vector AC represents the angle component and the vector DC represents the depth component, the actual swing of bar 4 will thus be a function of these two vectors, and may be represented by vector SDAC, the vectorial sum of the depth and angle components. The rudder action will thus lag the angular position of the torpedo body by the angle θ. The desired control effect is thus always somewhat late.

Since the velocity effect of the pendulum leads the hydrostatic effect by one hundred and eighty degrees, it is apparent that if a suitable control effect can be imparted to the link 11 as a function of the velocity of the pendulum, suitable compensation can be introduced for the lagging effect of the hydrostatic device without eliminating the useful function of this device. This is apparent from the fact the more excessive the swing of the torpedo in a vertical plane the greater is the velocity component and the more may the rudder position lead the angular swing.

To provide the velocity component on the depth control, I add the dash-pot arrangement DP. This arrangement comprises a closed chamber 18 preferably cylindrical in shape. Each end is provided with a large opening over each of which is positioned a bellows, as 20 and 21. The direct coupling arm 4 passes longitudinally through the chamber 18 and at 22 and 23 is brazed or soldered to the bellows 20 and 21. Since the bellows 20 and 21 are at their ends adjacent to the chamber 18 also brazed or soldered to the chamber 18, the whole forms a sealed compartment.

The arm 4 is provided at the mid-region of chamber 18 with a piston 24. The piston is preferably so designed that it has suitable clearance at the edge thereof with the interior surface of chamber 18 that the fluid in the chamber 18 may flow with a selected restriction from the aft region 25 to the forward region 26 or from the forward region 26 to the aft region 25, depending on the relative movement of the piston 24 and chamber 18.

If the clearance at the piston edge does not suffice for the purpose intended, the piston may be provided with one or more orifices of selected cross sectional area. In the preferred method of use the chamber is filled with an oil or other liquid having a fixed viscosity regardless of changes in temperature. Nothing more than a certain clearance at the piston edge, or orifices of fixed sectional area or both is thus needed to provide a damping effect to the relative movement between the piston 24 and the chamber 18 that is a function of the velocity of relative movement and no other factor.

However, should the liquid used in chamber 18 and/or some other factors require an adjustment in the restriction of liquid flow from one side of the piston 24 to the other, then the arm 4 may be provided with the channel 27. A needle valve 28 is threaded into the arm 4. This valve 28 may thus be adjusted longitudinally to alter the effective sectional area of channel 27 as desired.

The chamber 18 is connected to the vertical bar 8 by the link element 29. A centering spring 30 is at one end secured to the vertical arm 8 and at the other end to the base 31 constituting some member fixed to the torpedo frame.

To bring out the operation of my device, let the assumption be that at the moment under consideration the torpedo is diving so that the nose is moving downwardly and that the torpedo is operating at a depth greater than the set depth. Since the nose is moving downwardly, it will have a counterclockwise angular velocity value depending on the moment during the periodic swing under considerataion. During the moment of maximum acceleration, the velocity will, of course, be zero and during zero acceleration, the velocity will be a maximum.

As the direct coupling arm moves toward the left, for the operation assumed, the volume of region 26 tends to decrease whereas the volume of region 25 tends to increase. This is so because the centering spring 30 tends to hold the, so called, vertical bar 8 in fixed relation to the torpedo axis. Since the link element 29 interconnects the bar 8 and chamber 18, the chamber 18 tends to stay in a fixed position with reference to the torpedo.

Since the bellows 20 and 21 are rather flexible the volume of region 26 decreases whereas that of region 25 increases. This change in volume is, however, resisted by the restriction offered to the flow of fluid, as some suitable oil, through the orifices in the partition.

The greater the velocity of swing of the bar 4 the greater will be the resistance force caused by the flow of fluid. From this function, it is apparent that the forward movement of the chamber 18 and thus forward movement of the vertical bar 8 is a function of the velocity of movement of bar 4. The forward movement of pivot 14 is thus a function of the velocity of swing of the torpedo.

Since the lower end of the floating arm 6 moves forward as a function of the magnitude of the angular departure of the torpedo from the aspect angle as modified by the depth component and pivot 14 moves forward as a function of the velocity of movement of the bar 4, the link 11 will move forward as a function of the vectorial sum of the depth component DC, angle component AC, and angular velocity component AVC. This is clearly apparent from the showing in FIG. 3.

As shown in FIG. 3, the velocity component is shown as producing a slight lead, equal to the angle $a$, in the vectorial sum with reference to the angle component. Since the viscosity of the fluid used in chamber can be selected, at will, or the size of the orifice may be adjusted, or both may be varied at will, it is apparent that the angular velocity component can be chosen at will. For example, if the angular velocity component is made equal to the depth component, the resultant sum of the vector system will be in phase and equal in magnitude to the angular component.

While the foregoing description of operation relates only counterclockwise rotation of the torpedo, the device operates in a similar and equally effective manner if the condition chosen is a clockwise rotation of the torpedo.

While I have shown but one specific embodiment of my invention, I do not wish to be limited to the details shown but wish to be limited only by the scope of the claims hereto appended.

I claim as my invention:

1. In a system of control for a conveyance moving through a fluid medium, in combination, elevator rudders for the conveyance, pressure responsive control means producing a control effect as a function of the pressure of the medium surrounding the conveyance, pendulous means responsive to the angular magnitude of the departure of the axis of said conveyance with reference to a datum plane, velocity responsive control means responsive to the angular velocity of said conveyance with reference to the datum plane, and rudder actuating means operatively coupled to said pressure responsive control means, the pendulous means, and the velocity responsive control means to thus be responsive to the combined effect of said three mentioned means for controlling the operation of said elevator rudders.

2. In a depth control for a torpedo, in combination, a pendulum for measuring the magnitude of the departure of the torpedo from the aspect angle, a hydrostatic device responsive to the depth of the torpedo with reference to a set depth, elevator rudders for the torpedo, velocity responsive control means responsive to the velocity of the angular movement of the torpedo in a vertical plane and thus with reference to the aspect angle, and rudder actuating means operatively coupled to the pendulum, hydrostatic device and velocity responsive control means to thus be responsive to the combined control effects of said pendulum, hydrostatic device, and velocity responsive control means for controlling the position of the elevator rudders with reference to the longitudinal axis of the torpedo.

3. In a system of control for a body moving through a fluid medium and normally during such movement swinging angularly in a vertical plane such that the horizontal axis of the body swings above and below a horizontal plane, in combination, elevator rudders for said body, pendulous means for meansuring the instantaneous magnitudes of the angular positions of said longitudinal axis with reference to said horizontal plane during the angular swing of the body with reference to said horizontal plane, rudder actuating means operatively coupled to said pendulous means for operating the elevator rudders, pressure responsive control means responsive to the pressure of the medium surrounding the body coupled to the pendulous means for thus modifying the rudder control effect of said pendulous means, and angular velocity responsive means coupled to said pendulous means and responsive to the angular velocity of the pendulous means with reference to said longitudinal axis for thus also modifying the rudder control effect of said pendulous means.

4. In a system of control for a body moving through a fluid medium and normally during such movement swinging angularly in a vertical plane such that the horizontal axis of the body swings above and below a horizontal plane, in combination, elevator rudders for said body, pendulous means for measuring the instantaneous magnitudes of the angular positions of said longitudinal axis with reference to said horizontal plane during the angular swing of the body with reference to said horizontal plane, rudder actuating means operatively coupled to said pendulous means for operating the elevator rudders, pressure responsive control means responsive to the pressure of the medium surrounding the body coupled to the pendulous means for thus modifying the rudder control effect of said pendulous means, angular velocity responsive means coupled to said pendulous means and responsive to the angular velocity of the pendulous means with reference to said longitudinal axis for thus also modifying the rudder control effect of said pendulous means, and adjustable means for altering the control effect to any selected magnitude within a given range of the angular velocity responsive means.

5. In a system of control for a torpedo, in combination, elevator rudders for the torpedo, depth control means including pendulous means and a hydrostatic device for controlling the elevator rudders as a function of the vectorial sum of the angle component of the pendulous means with reference to the torpedo axis and depth component, and dashpot means, coupled to the pendulous means producing a control force proportional to the velocity of said pendulous means with reference to the torpedo to thus produce an additional control component on the elevator rudders as a function of the said angular velocity of the pendulous means with reference to the torpedo axis.

References Cited in the file of this patent

UNITED STATES PATENTS

| | | |
|---|---|---|
| 1,080,116 | Leavitt | Dec. 2, 1913 |
| 1,145,355 | Dieter | July 6, 1915 |
| 1,378,291 | Sperry | May 17, 1921 |
| 1,532,616 | Winkley | Apr. 7, 1925 |
| 1,570,542 | Winkley | Jan. 19, 1926 |
| 2,169,982 | Von Manteuffel | Aug. 15, 1939 |
| 2,340,041 | Carlson | Jan. 25, 1944 |

FOREIGN PATENTS

| | | |
|---|---|---|
| 406,950 | Germany | Dec. 8, 1924 |